S. A. GLIDDEN.
ANTISKID ATTACHMENT FOR VEHICLE WHEELS.
APPLICATION FILED FEB. 8, 1922.
1,431,392. Patented Oct. 10, 1922.
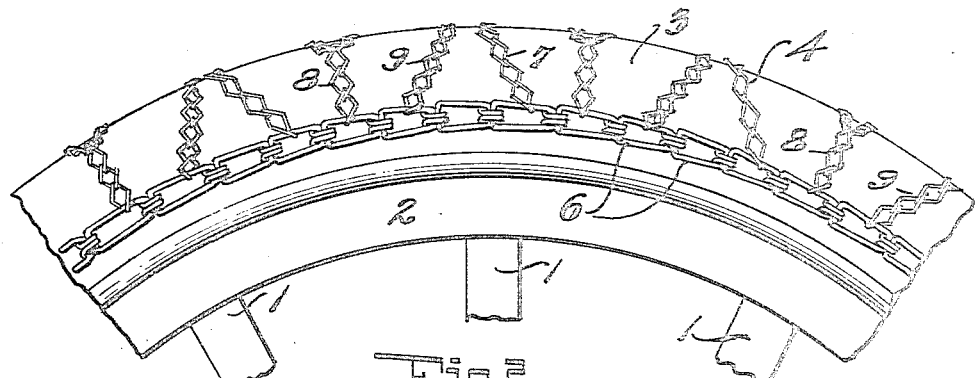
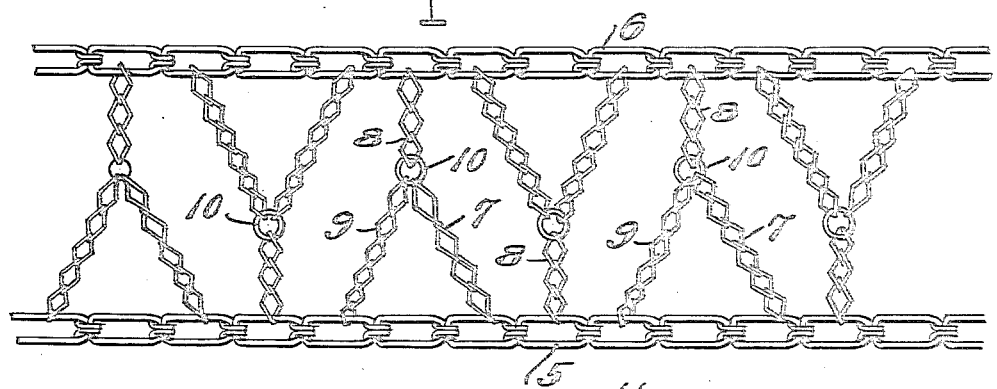
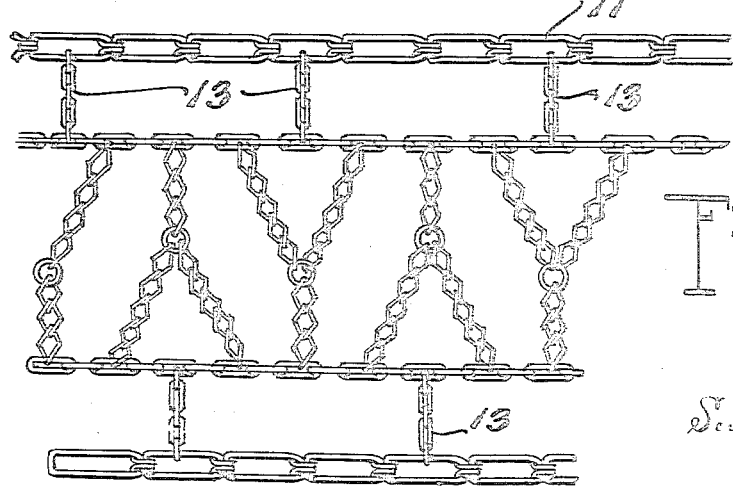
Inventor
Sewell A. Glidden
By Sommer & Sommer
Attorneys Patented Oct. 10, 1922.

1,431,392

UNITED STATES PATENT OFFICE.

SEWELL A. GLIDDEN, OF AUGUSTA, MAINE.

ANTISKID ATTACHMENT FOR VEHICLE WHEELS.

Application filed February 8, 1922. Serial No. 535,000.

*To all whom it may concern:*

Be it known that I, SEWELL A. GLIDDEN, a citizen of the United States, residing at Augusta, in the county of Kennebec and State of Maine, have invented certain new and useful Improvements in Antiskid Attachments for Vehicle Wheels, of which the following is a specification.

This invention relates to certain new and useful improvements in anti-skid attachments for vehicle wheels and it consists of a chain tread adapted to be removably applied to wheels, especially of the kind which are provided with rubber tires, either solid or pneumatic.

It has been found in practice that where the transverse elements between the parallel side chains extend directly across the circumferential tread of the tire, said elements develop a tendency to turn or roll which is quite unsatisfactory.

One of the objects of my invention is to overcome this difficulty and to construct an anti-skid chain which is thoroughly flexible and whose transverse elements are so placed with respect one to the other and with respect to the parallel side chains as largely to avoid the difficulty mentioned. Further, such a construction produces a constant gripping surface upon the tread and with maximum tractive effect.

To carry out the purposes of my invention, I place the greater part of the individual transverse elements, as they extend from one to the other of the parallel side chains, diagonally to the circumference of the wheel. Each of these elements is Y-shaped, the upper or spread portion thereof being attached to the other or straight portion by means of a ring. Each of these Y-shaped elements I locate in an oppositely disposed position with respect to its adjacent element, so that both the ring portion and the spread portion of the respective elements stand in staggered relation one to the other. By such an arrangement I find the tractive effect is greatly increased.

Another object of my invention is to construct a chain of such simplicity of design that its manufacture is economically facilitated, both in respect to the weight of metal used and the cost of production. In practice, my chain with its Y-shaped transverse elements uses less material and costs less than the forms in general use, with the exception of the anti-skid chain which is made with a single transverse element extending directly at right angles from one parallel side chain to the other. The tractive effect of my chain, however, greatly exceeds such anti-skid chain.

With these and other objects in view which may be incident to my improvements, the invention consists in the parts and combinations to be hereinafter set forth and claimed, with the understanding that the several necessary elements comprising my invention, may be varied in construction, proportions and arrangement, without departing from the spirit and scope of the appended claims.

In order to make my invention more clearly understood, I have shown in the accompanying drawings, means for carrying the same into practical effect, without limiting the improvements in their useful applications to the particular constructions, which, for the purpose of explanation, have been made the subject of illustration.

In the drawings:

Figure 1 represents a side view of one of my chains as it appears upon the pneumatic tire of a wheel.

Figure 2 is a plan view of the chain.

Figure 3 is a modified form of construction showing two parallel side chains on each side of the transverse elements.

The numeral 1 represents the spokes of a wheel partially broken away and the letter 2 the felly of the wheel to which the spokes are attached and upon which is mounted a pneumatic rubber tire 3. Over said tire, as shown in Figure 1, is fitted my improved anti-skid chain 4. This chain consists of two parallel side chains 5 and 6 of the usual or any improved construction, which are united by transverse elements extending from one to the other. Each of these elements comprise the members 7, 8, 9, one end of each of which is united to a metallic ring 10 and the other end of each of which is attached to one or the other of the parallel side chains 5 and 6. The elements, however, when positioned are placed side by side but in inverse order.

The three members when united, as just described, to the ring 10 and to the side chains, constitute a transverse element of the configuration of the letter Y and the letter Y inverted and, as will be observed more especially in Figures 2 and 3, the metallic rings 10 stand in staggered relation one to the other. The interstitial space between the parallel side chains is thus filled in by transverse elements which occupy alternately reversed and staggered positions with respect one to the other.

Figure 3 shows a modified form of construction which is found especially desirable for large tires, such as are used for heavy hauling, although it may be used for an ordinary size tire by reducing somewhat the length of the transverse elements so as to provide additional space on each side for the additional parallel side chains 11 and 12, between which extend at right angles the transverse elements 13.

It will be observed from the above that with the arrangement of chain elements described, no matter in which direction the car has a tendency to skid, the wheels provided with my anti-skid chains will always have a number of staggered members of the transverse elements disposed at substantially right angles to the skidding tendency, and a number of staggered rings in addition thereto.

I have found that both forms of the device illustrated in the drawings work satisfactorily in practice, some customers preferring one form and some the other. I, therefore, make both forms for the trade to suit the preference of individual customers, the second form, however, being somewhat more expensive to construct owing to the additional weight of metal used.

My improved chain may be attached to a wheel in any suitable and convenient maner, as this feature forms no part of my invention.

While I have shown and described the preferred embodiment of my invention, I wish it to be understood that I do not confine myself to the precise details of construction herein set forth by way of illustration, as it is apparent that many changes and variations may be made therein, by those skilled in the art, without departing from the spirit of the invention, or exceeding the scope of the appended claims.

I claim:

1. A device of the character described comprising parallel side chains and cross chain elements therebetween, each of said elements consisting of three separate pieces of chain, one end of each of which is connected to one of the side chains and the other ends of wh ch unite in a common ring adapted to lie flat in contact with the ground near the middle of the tread, each of the Y-elements being in reversed and staggered relation to its adjacent Y-element and so disposed with respect to each other that no part of the parallel side chains can contact with the ground without the simultaneous engagement of a portion of one of the Y-formations, and means for attaching said device to a vehicle wheel.

2. A device of the character described comprising outer parallel side chains, inner parallel side chains, transverse elements connecting the outer and inner side chains and at right angles thereto, cross chain Y-elements between the inner side chain elements, each of sa d Y-elements consisting of three separate pieces of chain, one end of which is connected to one of the inner side chains and the other ends of which unite in a common ring adapted to lie flat in contact with the ground near the middle of the tread, each of the Y-elements being in reversed and staggered relation to its adjacent Y-element, and means for attaching the device to a vehicle wheel.

In testimony whereof I affix my signature.

SEWELL A. GLIDDEN.